US012055153B1

(12) United States Patent
Chakrabarti et al.

(10) Patent No.: US 12,055,153 B1
(45) Date of Patent: Aug. 6, 2024

(54) VARIABLE PITCH AIRFOIL ASSEMBLY FOR AN OPEN FAN ROTOR OF AN ENGINE HAVING A DAMPING ELEMENT

(71) Applicant: General Electric Company, Schenectady, NY (US)

(72) Inventors: Suryarghya Chakrabarti, Mason, OH (US); Nicholas M. Daggett, Camden, ME (US); Zachary Pebley, Fairfield Township, OH (US)

(73) Assignee: General Electric Company, Cincinnati, OH (US)

( * ) Notice: Subject to any disclaimer, the term of this patent is extended or adjusted under 35 U.S.C. 154(b) by 0 days.

(21) Appl. No.: 18/528,977

(22) Filed: Dec. 5, 2023

(51) Int. Cl.
*F04D 27/00* (2006.01)
*F01D 5/10* (2006.01)
*F04D 29/66* (2006.01)

(52) U.S. Cl.
CPC ............. *F04D 27/002* (2013.01); *F01D 5/10* (2013.01); *F04D 29/668* (2013.01); *F05D 2220/36* (2013.01); *F05D 2260/70* (2013.01); *F05D 2260/96* (2013.01)

(58) Field of Classification Search
CPC ........ F04D 27/002; F04D 29/668; F01D 5/10; F05D 2220/36; F05D 2260/70; F05D 2260/96
See application file for complete search history.

(56) References Cited

U.S. PATENT DOCUMENTS

| | | | | |
|---|---|---|---|---|
| 5,056,738 | A | 10/1991 | Mercer et al. | |
| 5,065,959 | A | 11/1991 | Bhatia et al. | |
| 5,308,226 | A * | 5/1994 | Venkatasubbu | F01D 17/162 415/209.3 |
| 5,462,410 | A | 10/1995 | Smith et al. | |
| 6,767,183 | B2 * | 7/2004 | Schilling | F04D 29/083 415/230 |
| 7,094,022 | B2 * | 8/2006 | Bruce | F16C 33/043 415/160 |
| 7,220,098 | B2 * | 5/2007 | Bruce | F16C 33/10 415/200 |
| 7,946,818 | B2 | 5/2011 | Berghella et al. | |
| 9,334,751 | B2 | 5/2016 | Dube et al. | |
| 9,567,090 | B2 | 2/2017 | Gallet et al. | |
| 10,287,910 | B2 * | 5/2019 | Hartung | F01D 25/04 |
| 10,486,794 | B2 | 11/2019 | Kiesewetter et al. | |

(Continued)

FOREIGN PATENT DOCUMENTS

| | | | | |
|---|---|---|---|---|
| EP | 1717450 | A2 * | 11/2006 | B23P 6/002 |
| FR | 2943314 | A1 * | 9/2010 | B64C 11/06 |

(Continued)

*Primary Examiner* — Jesse S Bogue
(74) *Attorney, Agent, or Firm* — Dority & Manning, P.A.

(57) ABSTRACT

A variable pitch airfoil assembly for an engine includes a disk having an annular shape extending about an axial direction and an airfoil coupled to the disk via a platform. The airfoil extends outwardly from the disk in a radial direction and is rotatable relative to the disk about a pitch axis. The variable pitch airfoil assembly further includes a damping element positioned at least partially within the disk exterior of and adjacent to a perimeter of the platform so as to provide vibration damping by friction between the damping element, the platform, and the disk while also allowing for a pitch change of the airfoil.

20 Claims, 7 Drawing Sheets

(56) References Cited

U.S. PATENT DOCUMENTS

| | | | | |
|---|---|---|---|---|
| 11,359,509 | B1 | 6/2022 | O'Brien | |
| 11,624,293 | B2 * | 4/2023 | Ivakitch | F01D 17/162 415/149.4 |
| 2016/0341068 | A1 | 11/2016 | Robertson, Jr. et al. | |

FOREIGN PATENT DOCUMENTS

| | | | | |
|---|---|---|---|---|
| FR | 3087830 | A1 | 5/2020 | |
| FR | 3120663 | A1 * | 9/2022 | B64C 11/06 |
| GB | 2504969 | A | 2/2014 | |

* cited by examiner

VARIABLE PITCH AIRFOIL ASSEMBLY FOR AN OPEN FAN ROTOR OF AN ENGINE HAVING A DAMPING ELEMENT

FIELD

The present disclosure relates generally to an open fan rotor of an engine, and more particularly to a variable pitch airfoil assembly for an open fan rotor of an engine having a damping element for minimizing vibrations therein.

BACKGROUND

At least some gas turbine engines, such as turbofan engines, include a fan, a core engine, and a power turbine. The core engine includes at least one compressor, a combustor, and a high-pressure turbine coupled together in a serial flow relationship. More specifically, the compressor and high-pressure turbine are coupled through a first drive shaft to form a high-pressure rotor assembly. Air entering the core engine is mixed with fuel and ignited to form a high energy gas stream. The high energy gas stream flows through the high-pressure turbine to rotatably drive the high-pressure turbine such that the first drive shaft rotatably drives the compressor. The gas stream expands as it flows through a low-pressure turbine positioned aft of the high-pressure turbine. The low-pressure turbine includes a rotor assembly having a fan coupled to a second drive shaft. The low-pressure turbine rotatably drives the fan through the second drive shaft. Gas turbine engines further include various airfoils or blades throughout the various stages of the engine, such as fan blades, compressor blades, turbine blades, etc.

BRIEF DESCRIPTION OF THE DRAWINGS

A full and enabling disclosure of the present disclosure, including the best mode thereof, directed to one of ordinary skill in the art, is set forth in the specification, which makes reference to the appended figures, in which.

DETAILED DESCRIPTION

Figure 1:
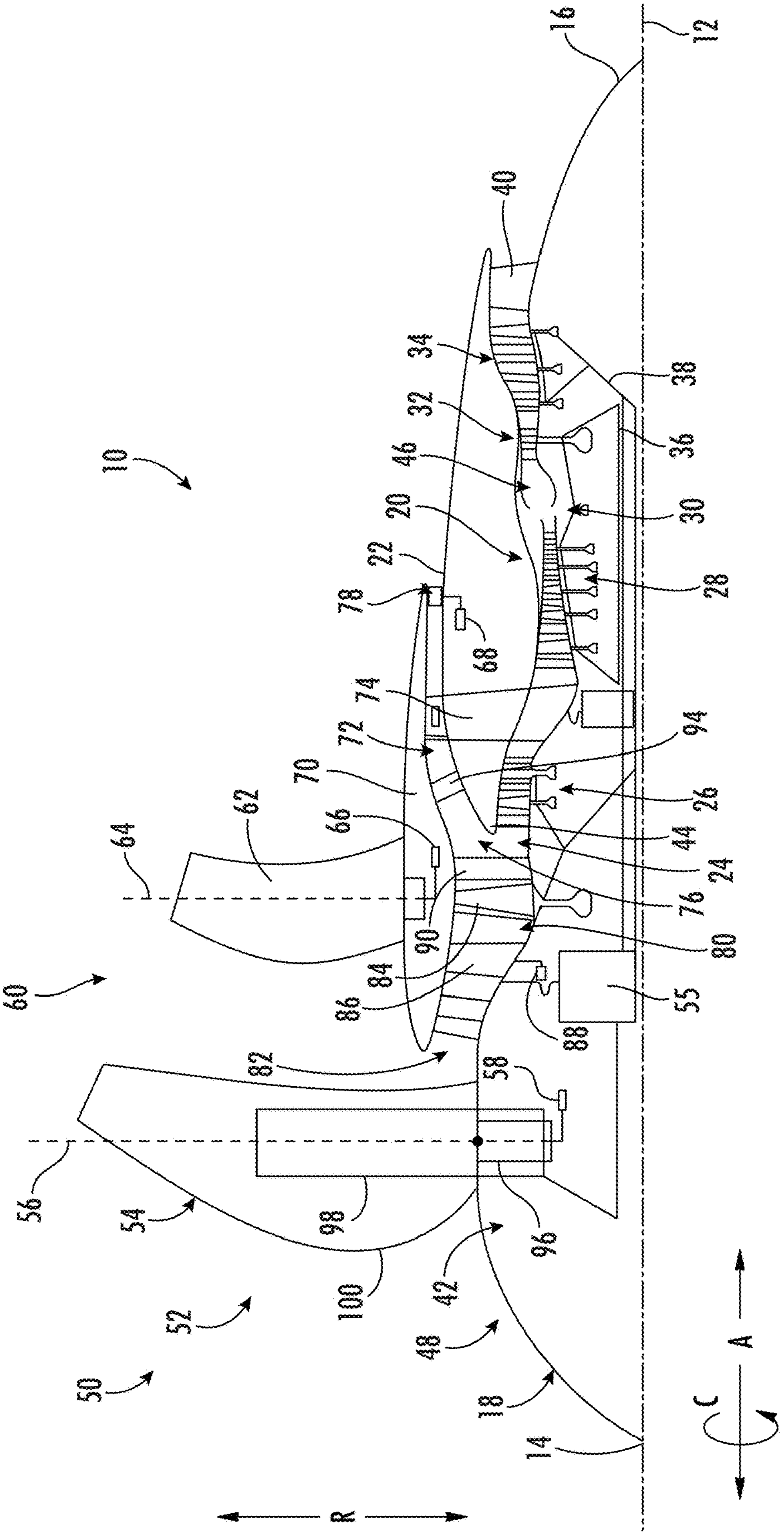
FIG. 1 is a schematic cross-sectional view of a gas turbine engine having an unducted fan in accordance with an exemplary aspect of the present disclosure.

Reference will now be made in detail to present embodiments of the disclosure, one or more examples of which are illustrated in the accompanying drawings. The detailed description uses numerical and letter designations to refer to features in the drawings. Like or similar designations in the drawings and description have been used to refer to like or similar parts of the disclosure.

The word "exemplary" is used herein to mean "serving as an example, instance, or illustration." Any implementation described herein as "exemplary" is not necessarily to be construed as preferred or advantageous over other implementations. Additionally, unless specifically identified otherwise, all embodiments described herein should be considered exemplary.

The singular forms "a," "an," and "the" include plural references unless the context clearly dictates otherwise.

The term "at least one of" in the context of, e.g., "at least one of A, B, or C" refers to only A, only B, only C, or any combination of A, B, and C.

The term "turbomachine" or "turbomachinery" refers to a machine including one or more compressors, a heat generating section (e.g., a combustion section), and one or more turbines that together generate a torque output.

The term "gas turbine engine" refers to an engine having a turbomachine as all or a portion of its power source. Example gas turbine engines as may be used in the present disclosure include unducted turbofan engines, ducted turbofan engines, or turboprop engines.

The terms "upstream" and "downstream" refer to the relative direction with respect to fluid flow in a fluid pathway. For example, "upstream" refers to the direction from which the fluid flows, and "downstream" refers to the direction to which the fluid flows.

As used herein, the terms "axial" and "axially" refer to directions and orientations that extend substantially parallel to a centerline of the gas turbine engine. Moreover, the terms "radial" and "radially" refer to directions and orientations that extend substantially perpendicular to the centerline of the gas turbine engine. In addition, as used herein, the terms "circumferential" and "circumferentially" refer to directions and orientations that extend arcuately about the centerline of the gas turbine engine.

The terms "coupled," "fixed," "attached to," and the like refer to both direct coupling, fixing, or attaching, as well as indirect coupling, fixing, or attaching through one or more intermediate components or features, unless otherwise specified herein.

As used herein, the terms "first," "second," and "third" may be used interchangeably to distinguish one component from another and are not intended to signify location or importance of the individual components.

For purposes of the description hereinafter, the terms "vertical," "radial", "axial," "longitudinal," and derivatives thereof shall relate to the embodiments as they are oriented in the drawing figures. However, it is to be understood that the embodiments may assume various alternative variations, except where expressly specified to the contrary. It is also to be understood that the embodiments illustrated in the attached drawings, and described in the following specification, are simply exemplary embodiments of the disclosure.

Hence, specific dimensions and other physical characteristics related to the embodiments disclosed herein are not to be considered as limiting.

The term "adjacent" as used herein with reference to two walls or surfaces refers to the two walls or surfaces contacting one another, or the two walls or surfaces being separated only by one or more nonstructural layers and the two walls or surfaces and the one or more nonstructural layers being in a serial contact relationship (i.e., a first wall/surface contacting the one or more nonstructural layers, and the one or more nonstructural layers contacting a second wall/surface).

As used herein, the term "integral" as used to describe a structure refers to the structure being formed integrally of a continuous material or group of materials with no seams, connections joints, or the like. The integral, unitary structures described herein may be formed through additive manufacturing to have the described structure, or alternatively through a ply layup process, a casting process, etc.

Reference will now be made in detail to present embodiments of the disclosure, one or more examples of which are illustrated in the accompanying drawings. The detailed description uses numerical and letter designations to refer to features in the drawings. Like or similar designations in the drawings and description have been used to refer to like or similar parts of the disclosure.

Variable pitch open rotor fans may experience high vibrations due to flutter, fan blade wakes, engine core vibrations, or other synchronous excitations. Traditional vibration damping technologies do not allow the blade to change pitch. Accordingly, in an embodiment, the present disclosure is directed to under-platform damping concepts for variable pitch fan blades. In an embodiment, a damping element is placed in an outer periphery of the blade platform, e.g., in a recess of a disk. Such embodiments utilize centrifugal loading to load the damper contact surfaces. Any motion on the blade platform (also referred to as a blade button) is damped by relative motion between the blade platform and damper and the damper and hub disk.

Accordingly, the present disclosure provides many technical advantages not present in the prior such, such as sufficient damping for fundamental modes, and allowing for blade pitch change. Moreover, the damping element(s) described herein are low-cost passive devices, retrofittable, and do not require changes in design to existing blade components.

Referring now to the drawings, wherein identical numerals indicate the same elements throughout the figures, FIG. 1 is a schematic cross-sectional view of a gas turbine engine 10 in accordance with an embodiment of the present disclosure. Particularly, FIG. 1 provides a turbofan engine having a rotor assembly with a single stage of unducted rotor blades. In such a manner, the rotor assembly may be referred to herein as an "unducted fan," or the entire engine 10 may be referred to as an "unducted turbofan engine." In addition, the engine 10 of FIG. 1 includes a third stream extending from the compressor section to a rotor assembly flow path over the turbomachine, as will be explained in more detail below.

For reference, the engine 10 defines an axial direction A, a radial direction R, and a circumferential direction C. Moreover, the engine 10 defines an axial centerline or longitudinal axis 12 that extends along the axial direction A. In general, the axial direction A extends parallel to the longitudinal axis 12, the radial direction R extends outward from and inward to the longitudinal axis 12 in a direction orthogonal to the axial direction A, and the circumferential direction C extends three hundred sixty degrees (360°) around the longitudinal axis 12. The engine 10 extends between a forward end 14 and an aft end 16, e.g., along the axial direction A.

The engine 10 includes a spinner cone 18 having a fan section 50 and a turbomachine 20 located downstream thereof. Generally, the turbomachine 20 includes, in serial flow order, a compressor section, a combustion section, a turbine section, and an exhaust section. Particularly, as shown in FIG. 1, the turbomachine 20 includes a core cowl 22 that defines an annular core inlet 24. The core cowl 22 further encloses at least in part a low pressure system and a high pressure system. For example, the core cowl 22 depicted encloses and supports at least in part a booster or low pressure ("LP") compressor 26 for pressurizing the air that enters the turbomachine 20 through core inlet 24. A high pressure ("HP"), multi-stage, axial-flow compressor 28 receives pressurized air from the LP compressor 26 and further increases the pressure of the air. The pressurized air stream flows downstream to a combustor 30 of the combustion section where fuel is injected into the pressurized air stream and ignited to raise the temperature and energy level of the pressurized air.

It will be appreciated that as used herein, the terms "high/low speed" and "high/low pressure" are used with respect to the high pressure/high speed system and low pressure/low speed system interchangeably. Further, it will be appreciated that the terms "high" and "low" are used in this same context to distinguish the two systems and are not meant to imply any absolute speed or pressure values.

The high energy combustion products flow from the combustor 30 downstream to an HP turbine 32. The HP turbine 32 drives the HP compressor 28 through a high pressure shaft 36. In this regard, the HP turbine 32 is drivingly coupled with the HP compressor 28. The high energy combustion products then flow to an LP turbine 34. The LP turbine 34 drives the LP compressor 26 and components of the fan section 50 through an LP shaft 38. In this regard, the LP turbine 34 is drivingly coupled with the LP compressor 26 and components of the fan section 50. The LP shaft 38 is coaxial with the HP shaft 36 in this example embodiment. After driving each of the HP and LP turbines 32, 34, the combustion products exit the turbomachine 20 through a turbomachine exhaust nozzle 40.

Accordingly, the turbomachine 20 defines a working gas flow path or core duct 46 that extends between the core inlet 24 and the turbomachine exhaust nozzle 40. The core duct 46 is an annular duct positioned generally inward of the core cowl 22 along the radial direction R. The core duct 46 (e.g., the working gas flow path through the turbomachine 20) may be referred to as a second stream.

The fan section 50 includes a fan 52, which is the primary fan in this example embodiment. For the depicted embodiment of FIG. 1, the fan 52 is an open rotor or unducted fan 52. In such a manner, the engine 10 may be referred to as an open rotor engine.

As depicted, the fan 52 includes an array of fan blades 54 (only one shown in FIG. 1). The fan blades 54 are rotatable, e.g., about the longitudinal axis 12. As noted above, the fan 52 is drivingly coupled with the LP turbine 34 via the LP shaft 38. For the embodiments shown in FIG. 1, the fan 52 is coupled with the LP shaft 38 via a speed reduction gearbox 55, e.g., in an indirect-drive or geared-drive configuration.

Moreover, the array of fan blades 54 can be arranged in equal spacing around the longitudinal axis 12. Each fan blade 54 has a root and a tip and a span defined therebetween. Each fan blade 54 defines a central blade axis 56. For this embodiment, each fan blade 54 of the fan 52 is rotatable about its central blade axis 56, e.g., in unison with one another. One or more actuators 58 are provided to facilitate such rotation and therefore may be used to change a pitch of the fan blades 54 about their respective central blades' axes 56.

The fan section 50 further includes a fan guide vane array 60 that includes fan guide vanes 62 (only one shown in FIG. 1) disposed around the longitudinal axis 12. For this embodiment, the fan guide vanes 62 are not rotatable about the longitudinal axis 12. Each fan guide vane 62 has a root and a tip and a span defined therebetween. The fan guide vanes 62 may be unshrouded as shown in FIG. 1 or, alternatively, may be shrouded, e.g., by an annular shroud spaced outward from the tips of the fan guide vanes 62 along the radial direction R or attached to the fan guide vanes 62.

Each fan guide vane 62 defines a central blade axis 64. For this embodiment, each fan guide vane 62 of the fan guide vane array 60 is rotatable about its respective central blade axis 64, e.g., in unison with one another. One or more actuators 66 are provided to facilitate such rotation and therefore may be used to change a pitch of the fan guide vane 62 about its respective central blade axis 64. However, in other embodiments, each fan guide vane 62 may be fixed or unable to be pitched about its central blade axis 64. The fan guide vanes 62 are mounted to a fan cowl 70.

As shown in FIG. 1, in addition to the fan 52, which is unducted, a ducted fan 84 is included aft of the fan 52, such that the engine 10 includes both a ducted and an unducted fan which both serve to generate thrust through the movement of air without passage through at least a portion of the turbomachine 20 (e.g., without passage through the HP compressor 28 and combustion section for the embodiment depicted). The ducted fan 84 is rotatable about the same axis (e.g., the longitudinal axis 12) as the fan blade 54. The ducted fan 84 is, for the embodiment depicted, driven by the low pressure turbine 34 (e.g., coupled to the LP shaft 38). In the embodiment depicted, as noted above, the fan 52 may be referred to as the primary fan, and the ducted fan 84 may be referred to as a secondary fan. It will be appreciated that these terms "primary" and "secondary" are terms of convenience, and do not imply any particular importance, power, or the like.

The ducted fan 84 includes a plurality of fan blades (not separately labeled in FIG. 1) arranged in a single stage, such that the ducted fan 84 may be referred to as a single stage fan. The fan blades of the ducted fan 84 can be arranged in equal spacing around the longitudinal axis 12. Each blade of the ducted fan 84 has a root and a tip and a span defined therebetween.

The fan cowl 70 annularly encases at least a portion of the core cowl 22 and is generally positioned outward of at least a portion of the core cowl 22 along the radial direction R. Particularly, a downstream section of the fan cowl 70 extends over a forward portion of the core cowl 22 to define a fan duct flow path, or simply a fan duct 72. According to this embodiment, the fan flow path or fan duct 72 may be understood as forming at least a portion of the third stream of the engine 10.

Incoming air may enter through the fan duct 72, through a fan duct inlet 76, and may exit through a fan exhaust nozzle 78 to produce propulsive thrust. The fan duct 72 is an annular duct positioned generally outward of the core duct 46 along the radial direction R. The fan cowl 70 and the core cowl 22 are connected together and supported by a plurality of substantially radially extending, circumferentially spaced stationary struts 74 (only one shown in FIG. 1). The stationary struts 74 may each be aerodynamically contoured to direct air flowing thereby. Other struts in addition to the stationary struts 74 may be used to connect and support the fan cowl 70 or core cowl 22. In many embodiments, the fan duct 72 and the core duct 46 may at least partially co-extend (generally axially) on opposite sides (e.g., opposite radial sides) of the core cowl 22. For example, the fan duct 72 and the core duct 46 may each extend directly from a leading edge 44 of the core cowl 22 and may partially co-extend generally axially on opposite radial sides of the core cowl 22.

The engine 10 also defines or includes an inlet duct 80. The inlet duct 80 extends between an engine inlet 82 and the core inlet 24/fan duct inlet 76. The engine inlet 82 is defined generally at the forward end of the fan cowl 70 and is positioned between the fan 52 and the fan guide vane array 60 along the axial direction A. The inlet duct 80 is an annular duct that is positioned inward of the fan cowl 70 along the radial direction R. Air flowing downstream along the inlet duct 80 is split, not necessarily evenly, into the core duct 46 and the fan duct 72 by a fan duct splitter or leading edge 44 of the core cowl 22. In the embodiment depicted, the inlet duct 80 is wider than the core duct 46 along the radial direction R. The inlet duct 80 is also wider than the fan duct 72 along the radial direction R.

Notably, for the embodiment depicted, the engine 10 includes one or more features to increase an efficiency of a third stream thrust, Fn3S (e.g., a thrust generated by an airflow through the fan duct 72 exiting through the fan exhaust nozzle 78, generated at least in part by the ducted fan 84). In particular, the engine 10 further includes an array of inlet guide vanes 86 positioned in the inlet duct 80 upstream of the ducted fan 84 and downstream of the engine inlet 82. The array of inlet guide vanes 86 are arranged around the longitudinal axis 12. For this embodiment, the inlet guide vanes 86 are not rotatable about the longitudinal axis 12. Each inlet guide vanes 86 defines a central blade axis (not labeled for clarity), and is rotatable about its respective central blade axis, e.g., in unison with one another. In such a manner, the inlet guide vanes 86 may be considered a variable geometry component. One or more actuators 88 are provided to facilitate such rotation and therefore may be used to change a pitch of the inlet guide vanes 86 about their respective central blade axes. However, in other embodiments, each inlet guide vanes 86 may be fixed or unable to be pitched about its central blade axis.

Further, located downstream of the ducted fan 84 and upstream of the fan duct inlet 76, the engine 10 includes an array of outlet guide vanes 90. As with the array of inlet guide vanes 86, the array of outlet guide vanes 90 are not rotatable about the longitudinal axis 12. However, for the embodiment depicted, unlike the array of inlet guide vanes 86, the array of outlet guide vanes 90 are configured as fixed-pitch outlet guide vanes.

Further, it will be appreciated that for the embodiment depicted, the fan exhaust nozzle 78 of the fan duct 72 is further configured as a variable geometry exhaust nozzle. In such a manner, the engine 10 includes one or more actuators 68 for modulating the variable geometry exhaust nozzle. For example, the variable geometry exhaust nozzle may be configured to vary a total cross-sectional area (e.g., an area of the nozzle in a plane perpendicular to the longitudinal axis 12) to modulate an amount of thrust generated based on one or more engine operating conditions (e.g., temperature, pressure, mass flowrate, etc. of an airflow through the fan duct 72). A fixed geometry exhaust nozzle may also be adopted.

The combination of the array of inlet guide vanes 86 located upstream of the ducted fan 84, the array of outlet guide vanes 90 located downstream of the ducted fan 84, and the fan exhaust nozzle 78 may result in a more efficient generation of third stream thrust, Fn3S, during one or more engine operating conditions. Further, by introducing a variability in the geometry of the inlet guide vanes 86 and the fan exhaust nozzle 78, the engine 10 may be capable of generating more efficient third stream thrust, Fn3S, across a relatively wide array of engine operating conditions, including takeoff and climb (where a maximum total engine thrust FnTotal, is generally needed) as well as cruise (where a lesser amount of total engine thrust, FnTotal, is generally needed).

Moreover, referring still to FIG. 1, in exemplary embodiments, air passing through the fan duct 72 may be relatively cooler (e.g., lower temperature) than one or more fluids utilized in the turbomachine 20. In this way, one or more heat exchangers 94 may be positioned in thermal communication with the fan duct 72. For example, one or more heat exchangers 94 may be disposed within the fan duct 72 and utilized to cool one or more fluids from the core engine with the air passing through the fan duct 72, as a resource for removing heat from a fluid, e.g., compressor bleed air, oil, or fuel.

Although not depicted, the heat exchanger 94 may be an annular heat exchanger extending substantially 360 degrees in the fan duct 72 (e.g., at least 300 degrees, such as at least 330 degrees). In such a manner, the heat exchanger 94 may effectively utilize the air passing through the fan duct 72 to cool one or more systems of the engine 10 (e.g., lubrication oil systems, compressor bleed air, electrical components, etc.). The heat exchanger 94 uses the air passing through the fan duct 72 as a heat sink and correspondingly increases the temperature of the air downstream of the heat exchanger 94 exiting the fan exhaust nozzle 78.

It should be appreciated that the engine 10 depicted in FIG. 1 and described herein is by way of example only, and that embodiments of the present disclosure may be incorporated in other gas turbine engines as well (such as a ducted turbofan engines).

Figure 2:
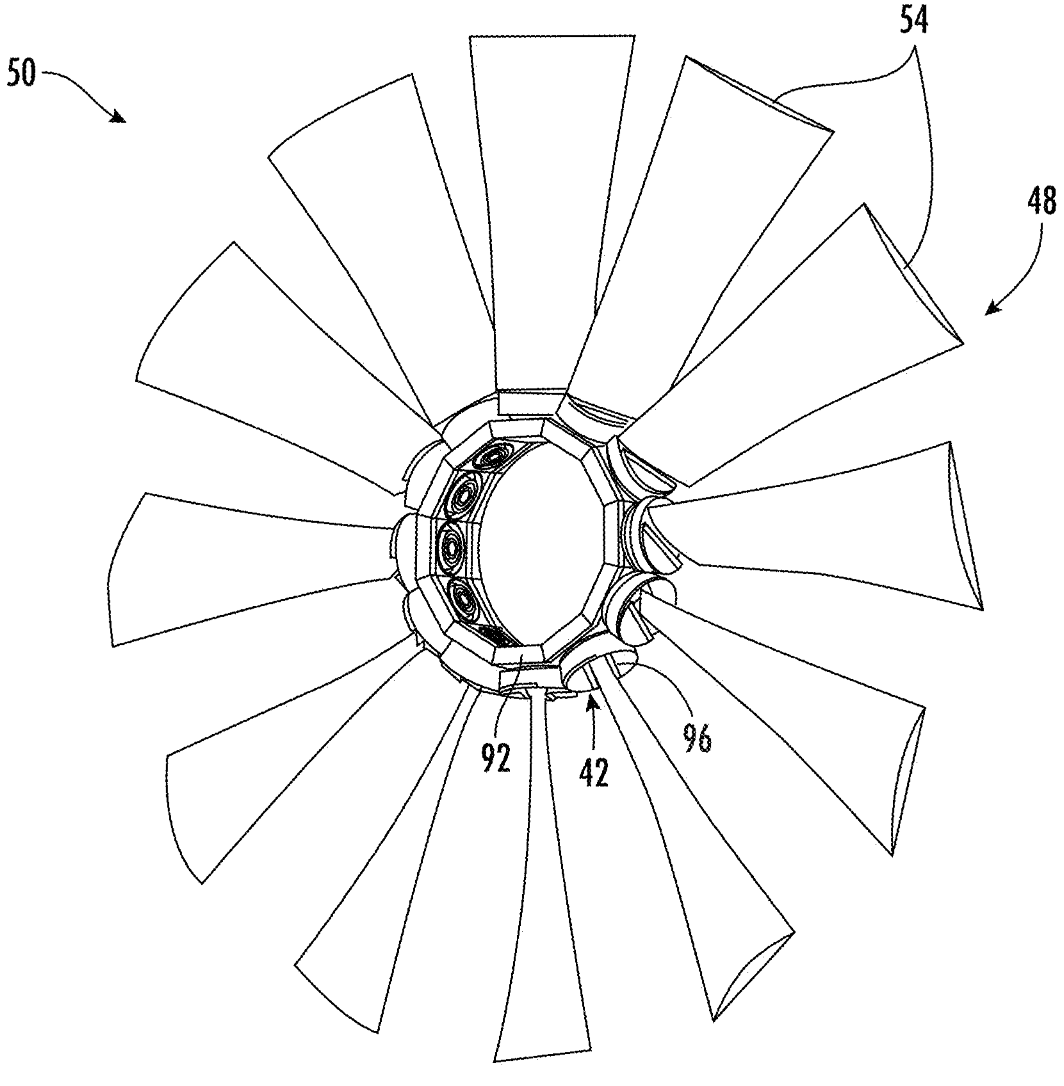
FIG. 2 is a perspective view of a variable pitch fan assembly of a gas turbine engine in accordance with an exemplary aspect of the present disclosure.

Referring now to FIGS. 1 and 2, the fan section 50 includes a variable pitch fan assembly 48 coupled to a disk 42 having a plurality of disk segments 92 in a spaced apart manner. The disk 42 may have a generally annular shape about the axial direction A. Further, in an embodiment, the fan blades 54 extend outwardly from the disk 42 generally along the radial direction R. Each fan blade 54 is also rotatable relative to the disk 42 about central blade axis 56 by virtue of the fan blades 54 being operatively coupled to the actuator(s) 58 configured to collectively vary the pitch of the fan blades 54 in unison.

Referring particularly to FIG. 2, a perspective view of an embodiment of the fan assembly 48 of the fan section 50 of the engine 10 of FIG. 1 is illustrated. For the embodiment depicted, the fan assembly 48 includes twelve (12) fan blades 54. From a loading standpoint, such a blade count may allow a span of each fan blade 54 to be reduced such that the overall diameter of the fan assembly 48 may also be reduced (e.g., to about twelve feet in one exemplary embodiment). That said, in other embodiments, the fan assembly 48 may have any suitable blade count and any suitable diameter. In certain suitable embodiments, the fan includes at least eight (8) blades. In another suitable embodiment, the fan may have at least fifteen (15) blades. In yet another suitable embodiment, the fan may have at least eighteen (18) blades. In one or more of these embodiments, the fan includes twenty-six (26) or fewer blades, such as twenty (20) or fewer blades.

Referring to FIGS. 1 and 2, the fan blades 54 generally include a trunnion 96 and a blade spar 98 (FIG. 1) upon which is coupled a fan airfoil 100 through a physical attachment or bonding process. The trunnion 96 and blade spar 98 can be made as an integral component through any suitable manufacturing process, including but not limited to any suitable bonding process, such as through metallurgical bonding, or casting process, or physical attachment process, to set forth just a few non-limiting examples. In an example, the trunnion 96 is integral with the blade spar 98 where both are of metallic material in one form, or metallic/polymer matrix composite (PMC) hybrid in another form. Other material types are also contemplated.

Figure 3:
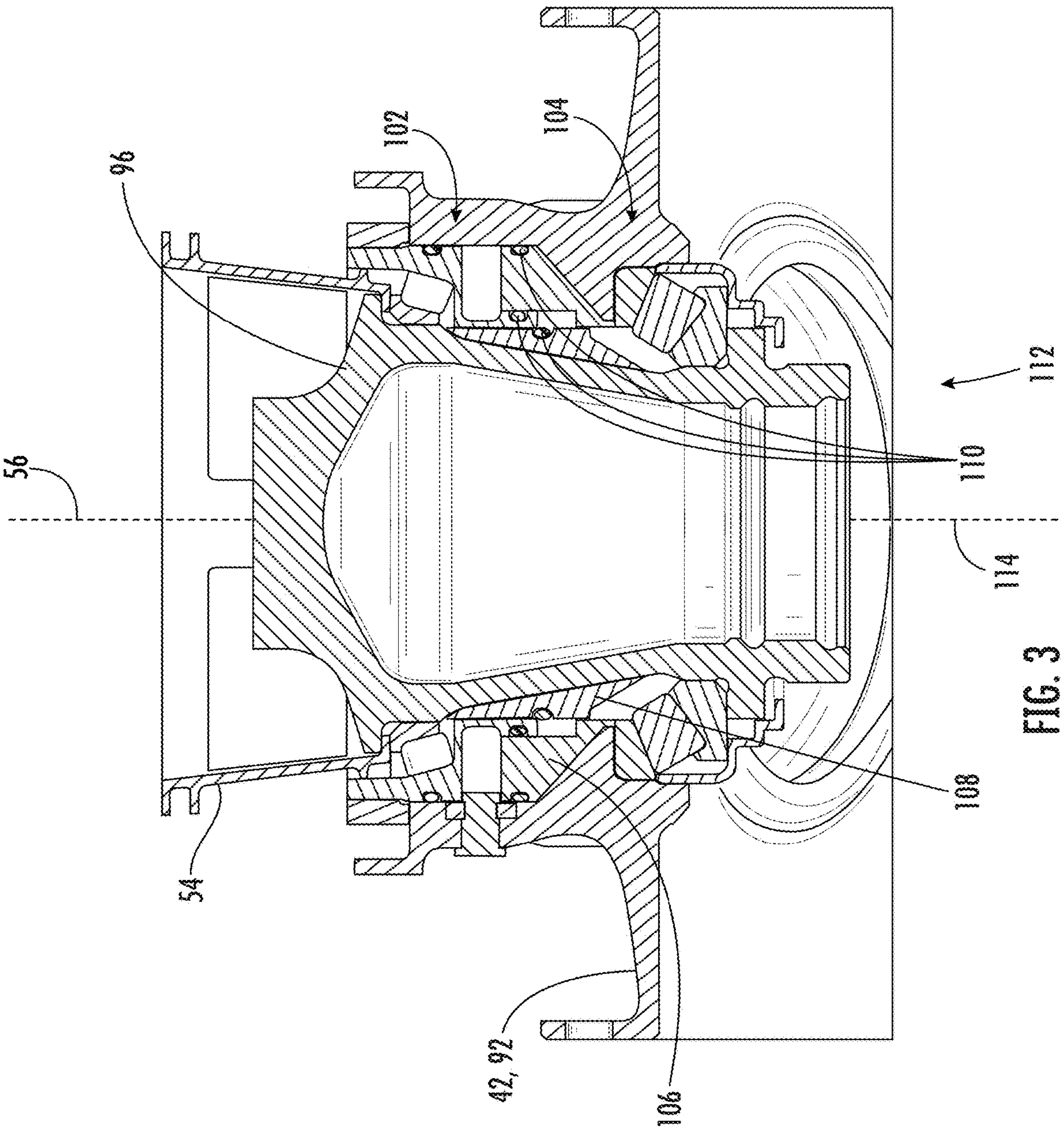
FIG. 3 is a cross-sectional view of a root portion of an airfoil coupled to a disk in accordance with an exemplary aspect of the present disclosure.

Referring to FIGS. 2 and 3, the trunnion 96 is coupled to the disk 42 that is driven by the LP shaft 38 (FIG. 1). The connection point of the LP shaft 38 to the disk 42 is indicated in FIG. 1 as being located on an axial forward end of the disk 42, but in other embodiments, the LP shaft 38 can be connected to the disk 42 in other locations, including on an axial aft end of the disk 42.

In an embodiment, as shown, the trunnion 96 is coupled to the disk 42 via a top bearing 102 and a bottom bearing 104. As will be appreciated, the top bearing 102 and the bottom bearing 104 aid in positioning and supporting the trunnion 96 within the disk 42, but also crucially permit relative motion to occur between the trunnion 96 and the disk 42. The top bearing 102 can be used in some forms to provide a wheelbase to react a moment during operation of the fan blades 54. The bottom bearing 104 can be used in some forms to provide a primary radial retention of the fan blades 54.

A number of inserts can be used to occupy space defined between the top bearing 102 and the bottom bearing 104, and also defined between an inner wall of the disk 42 and the outer surface of the trunnion 96. Such inserts can be connected to either trunnion 96 or the disk 42. Depicted in FIG. 3 are inserts 106 and 108. The inserts 106 and 108 can take a variety of forms including, but not limited to, foam inserts. In one form, the foam inserts 106 and 108 can be a closed foam construction formed from any suitable material, including but not limited to foamed metal. The foam inserts 106 and 108 can be used to decrease the volume needed when supplying hydraulic fluid to urge the trunnion 96 to move and therefore create loading upon the top bearing 102 and the bottom bearing 104.

The construction depicted in FIG. 3 includes the use of several sealing elements to prevent intrusion of foreign materials or leakage of lubricant. O-rings 110 can be used to seal between various stationary and moving parts. For example, an O-ring 110 is located between the relatively stationary foam insert 106 and an inner surface of the disk 42. An O-ring 110 is also located between the foam insert 108 and the bearing carrier of the top bearing 102, where such O-ring permits sliding movement between the bearing carrier of the top bearing 102 and the foam insert 106.

Figure 4:
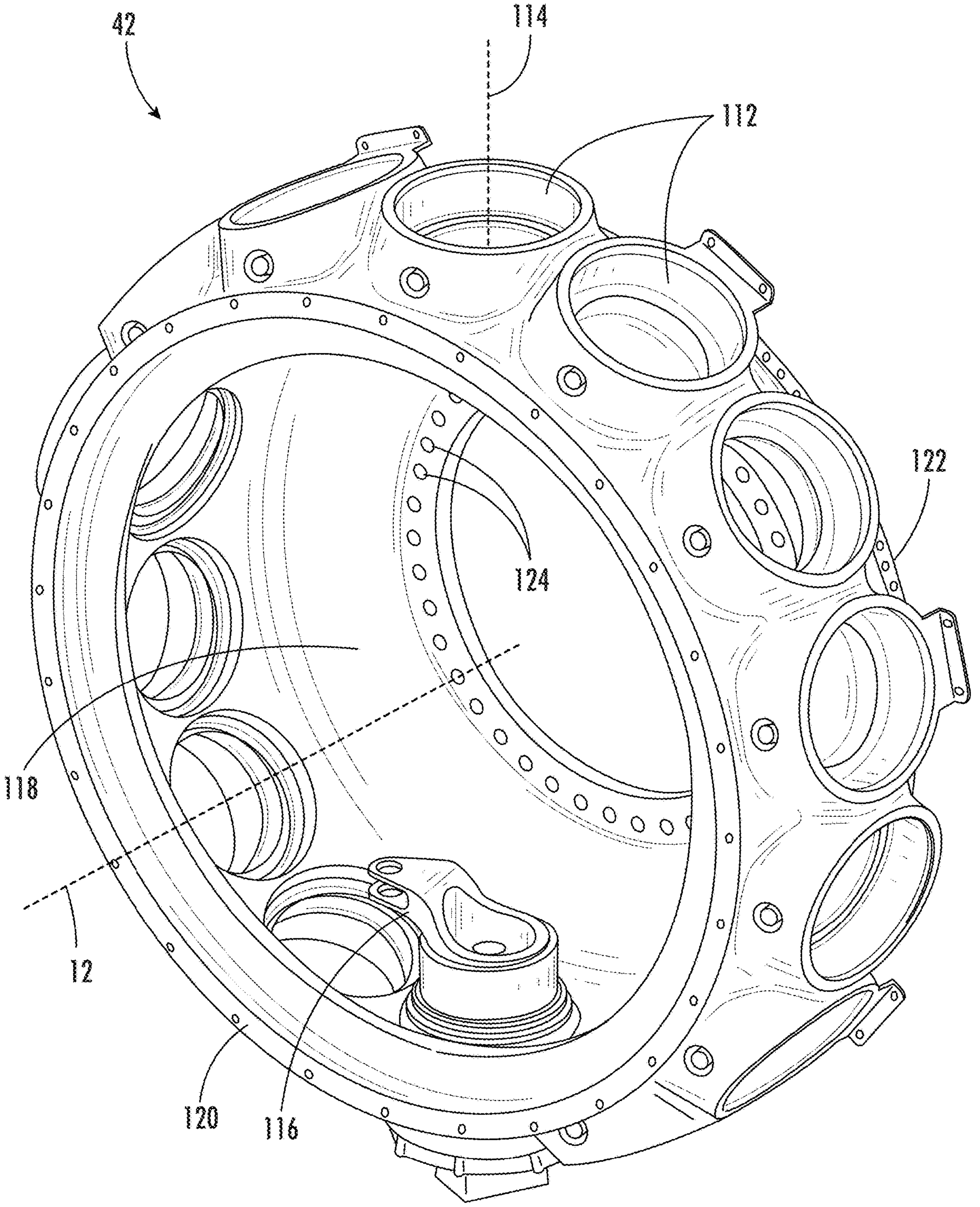
FIG. 4 is a perspective view of a disk of an airfoil assembly of a gas turbine engine in accordance with an exemplary aspect of the present disclosure.

Referencing now both FIGS. 3 and 4, the disk 42 includes several features including a plurality of trunnion apertures 112 each of which is constructed to receive an associated trunnion 96 such as that illustrated in FIG. 3. Each of the trunnion apertures 112 is arranged along a central aperture axis 114 along which the trunnion 96 is inserted. When inserted, the trunnion 96 can be rotated about the central aperture axis 114 to rotate the fan blades 54, where such rotation can be accomplished by a bell crank 116 attached to the trunnion 96. An actuator (e.g., 58 from FIG. 1) can be used to manipulate the orientation of the bell crank 116, and therefore the orientation of the fan blades 54. It will be appreciated that the central blade axis 56 (FIG. 1) can be coincident with the central aperture axis 114 in some embodiments, but in other embodiments need not be coincident. It will also be appreciated that the central blade axis 56 and central aperture axis 114 are substantially transverse to the longitudinal axis 12 (FIG. 1). In some forms either or both of the central blade axis 56 and central aperture axis 114 are perpendicular to the longitudinal axis 12.

As shown particularly in FIG. 4, the disk 42 is annular in shape and includes several provisions to incorporate it into the gas turbine engine 10 (FIG. 1). The annular shape includes a large open interior 118. The disk 42 is constructed to rotate about the longitudinal axis 12 when installed on the gas turbine engine 10. A forward end 120 can be coupled with the spinner cone 18 (FIG. 1), and a rear end 122 to the LP shaft 138 (FIG. 1) via a plurality of fasteners inserted through respective ones of a plurality of fastener apertures 124.

Figure 5:
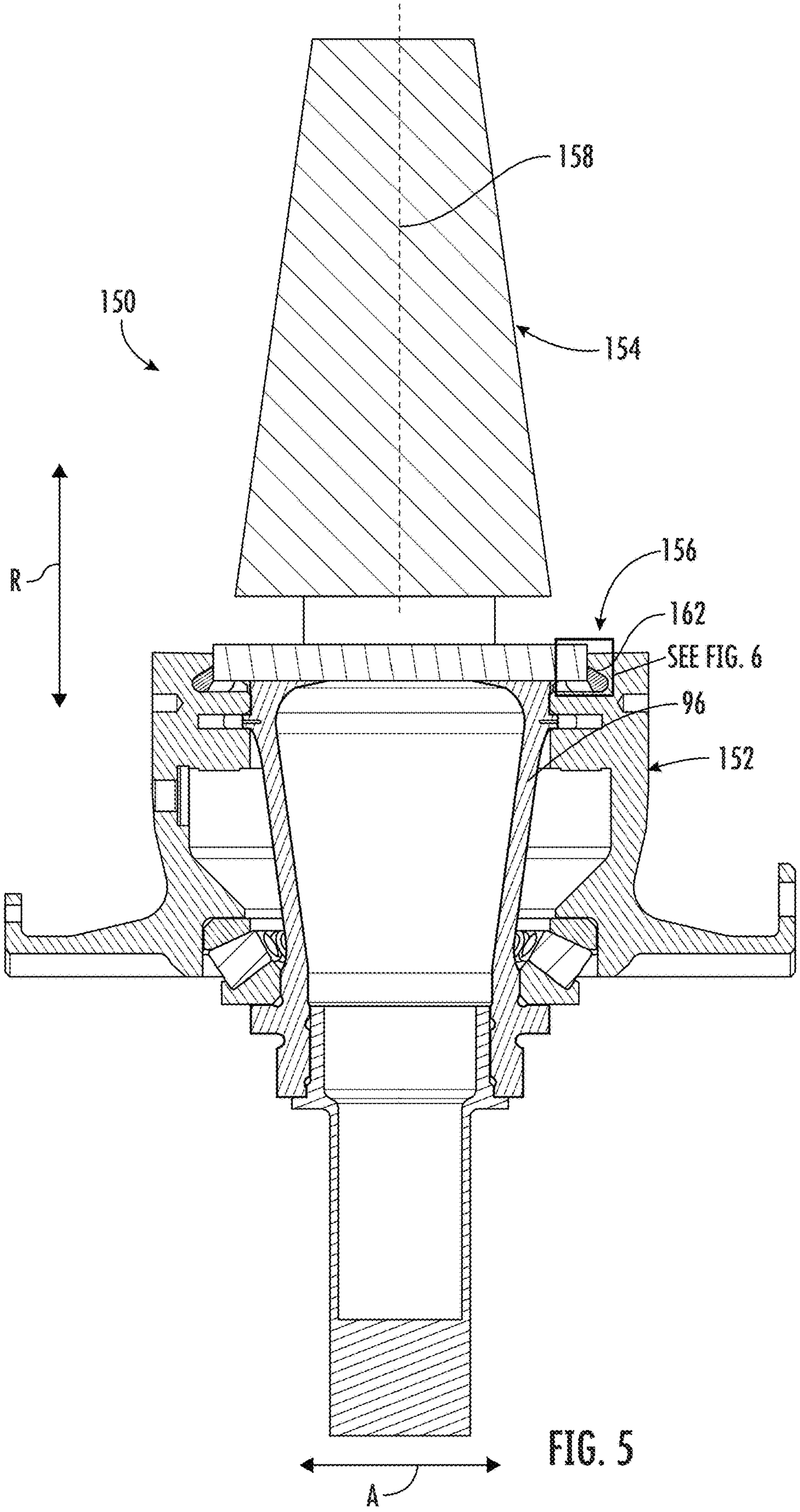
FIG. 5 is a cross-sectional view of a variable pitch fan assembly in accordance with an exemplary aspect of the present disclosure, particularly illustrating an airfoil coupled to a disk.

Referring now to FIGS. 5, a cross-sectional view of a portion of a variable pitch airfoil assembly 150 for an engine is illustrated according to the present disclosure. In particular, the variable pitch airfoil assembly 150 may be a variable pitch fan assembly that is part of the fan section 50 of the gas turbine engine 10 of FIG. 1 described herein. As shown, the variable pitch airfoil assembly 150 includes a disk 152 having an annular shape extending about an axial direction A. In an embodiment, for example, the disk 152 may be configured similar to disk 42 (FIGS. 1-4). Further, as shown, the variable pitch airfoil assembly 150 includes an airfoil 154 coupled to the disk 152 via a platform 156. Moreover, as shown, the airfoil 154 extends outwardly from the disk 152 in a radial direction R and is rotatable relative to the disk 152 about a pitch axis 158.

Referring particularly to FIGS. 5-8, the variable pitch airfoil assembly 150 further includes at least one damping element 160 for damping vibrations thereof. In an embodiment, for example, as shown, the damping element(s) 160 is positioned at least partially within the disk 152 exterior of and adjacent to a perimeter 162 (FIGS. 5 and 6) of the platform 156 so as to provide vibration damping by friction between the damping element 160, the platform 156, and the disk 152.

Figure 6:
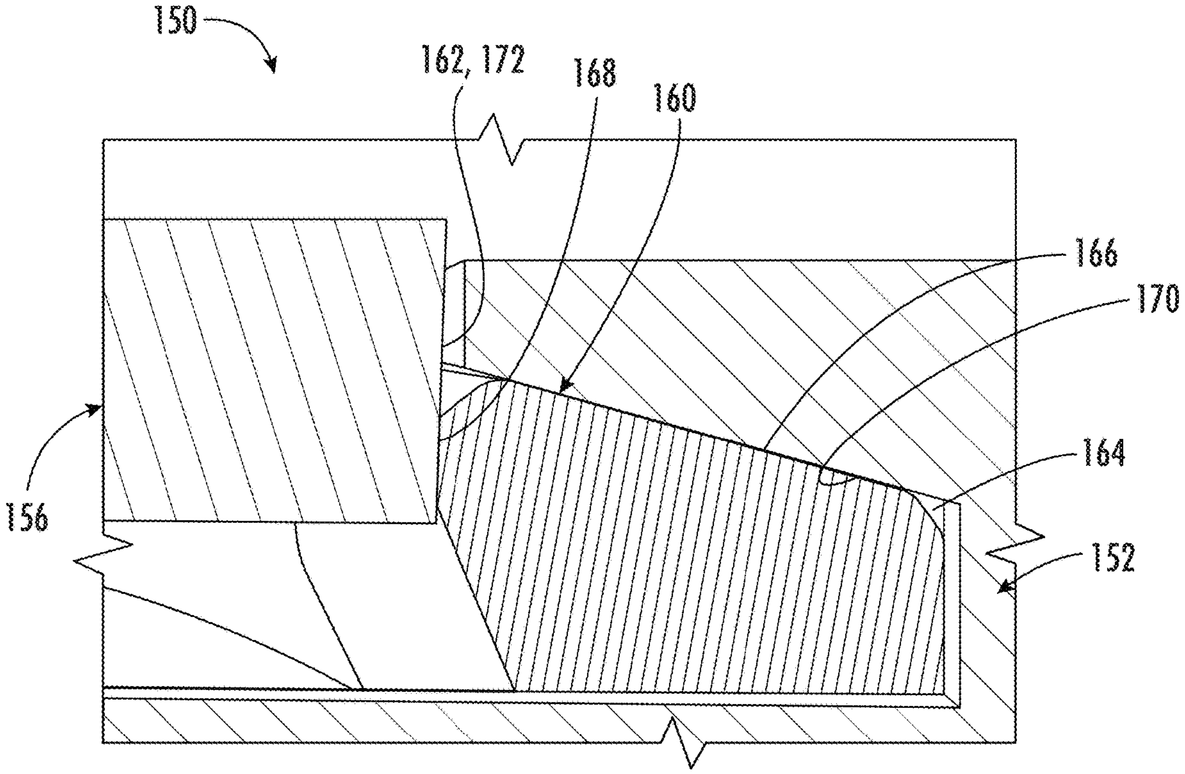
FIG. 6 is a cross-sectional view of a damping element of a variable pitch fan assembly in accordance with an exemplary aspect of the present disclosure.

In particular embodiments, as shown in FIGS. 5-6, the damping element 160 is positioned within a recess 164 of the disk 152 adjacent to the perimeter 162 of the platform 156. Furthermore, in an embodiment, as shown particularly in FIG. 6, the damping element 160 includes a first surface 166 contacting an interior surface 170 of the recess 164 of the disk 152 and a second surface 168 contacting an exterior surface 172 of the platform 156, e.g., defined by the perimeter 162 of the platform 156. More specifically, as shown, the first surface 166 of the damping element 160 is flat, whereas the second surface 168 of the damping element 160 is arcuate so as to follow a curvature of the platform 156. Accordingly, in the illustrated embodiment, the friction between the damping element 160, the platform 156, and the disk 152 occurs as a result of centrifugal forces that load the first and second surfaces 166, 168 of the damping element 160.

Figure 7:
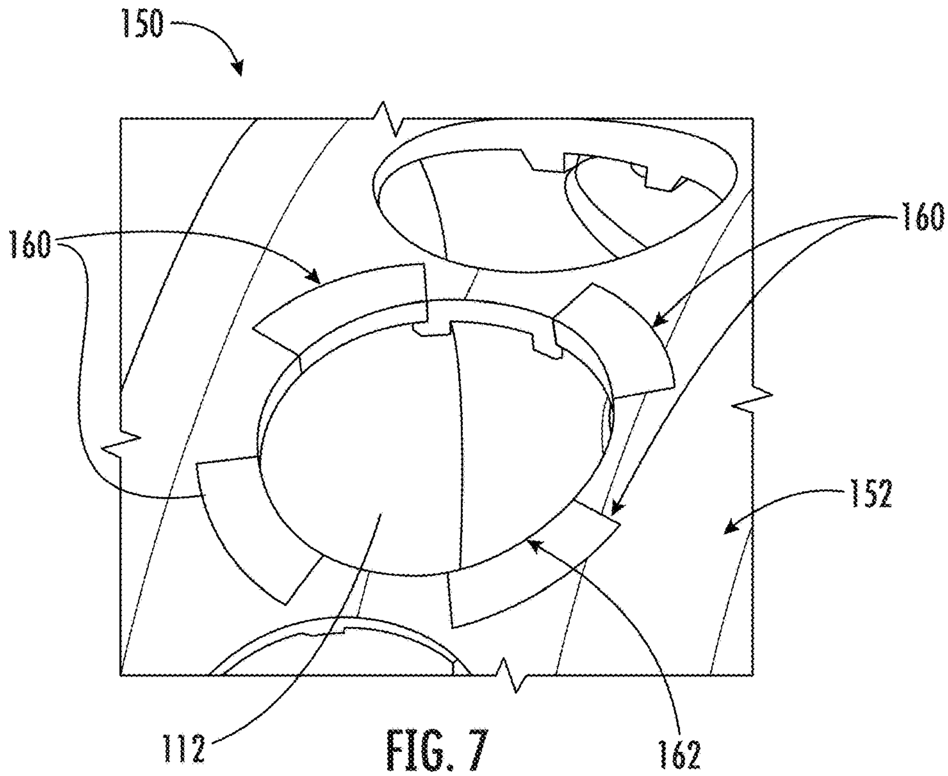
FIG. 7 is a partial, perspective view of a plurality of damping elements of a variable pitch fan assembly arranged around a perimeter of a blade platform in accordance with an exemplary aspect of the present disclosure.
Figure 8:
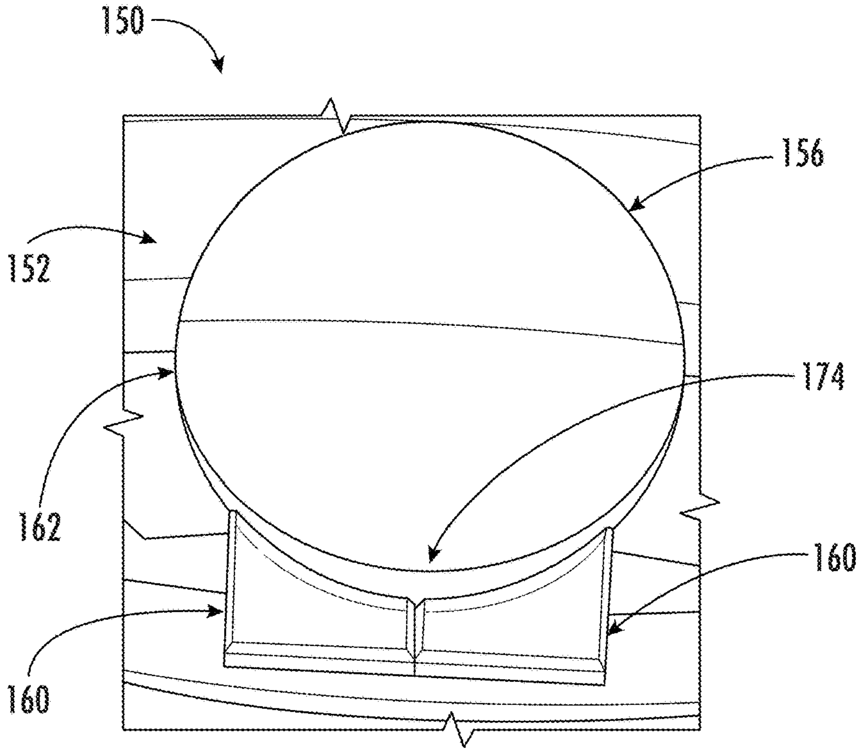
FIG. 8 is a partial, perspective view of a plurality of damping elements of a variable pitch fan assembly arranged on a first side of a blade platform in accordance with an exemplary aspect of the present disclosure.

It should be understood that any suitable number of damping elements 160 may be arranged in the variable pitch airfoil assembly 150 to provide a desired amount of damping and the damping elements 160 may be arranged in any suitable manner. For example, as shown in FIG. 7, the variable pitch airfoil assembly 150 includes a plurality of damping elements 160 positioned at least partially within the disk 152 around the perimeter 162 of the platform 156 (FIG. 6). Moreover, as shown, the plurality of damping elements 160 are evenly spaced apart around the perimeter of the platform 156. In an alternative embodiment, as shown in FIG. 8, the plurality of damping elements 160 are positioned on a first side 174 of the perimeter 162 of the platform 156. In such embodiments, the plurality of damping elements 160 are configured to ensure multi-point contact to the platform 156, thereby ensuring effectiveness regardless of blade pitch angle. In addition, as shown, the plurality of damping elements 160 contact each other on the first side 174 of the perimeter 162 of the platform 156. In further embodiments, the plurality of damping elements 160 may be arranged on the first side 174 of the perimeter 162 of the platform 156 with a space or gap between.

Further aspects are provided by the subject matter of the following clauses:

A variable pitch airfoil assembly for an engine, the variable pitch airfoil assembly comprising: a disk having an annular shape extending about an axial direction; an airfoil coupled to the disk via a platform, the airfoil extending outwardly from the disk in a radial direction and being rotatable relative to the disk about a pitch axis; and a damping element positioned at least partially within the disk exterior of and adjacent to a perimeter of the platform so as to provide vibration damping by friction between the damping element, the platform, and the disk while also allowing for a pitch change of the airfoil.

The variable pitch airfoil assembly of any preceding clause, wherein the damping element is positioned within a recess of the disk adjacent to the perimeter of the platform.

The variable pitch airfoil assembly of any preceding clause, wherein the damping element comprises a first surface contacting an interior surface of the recess of the disk and a second surface contacting the platform.

The variable pitch airfoil assembly of any preceding clause, wherein the first surface of the damping element is flat, and the second surface is arcuate.

The variable pitch airfoil assembly of any preceding clause, further comprising a plurality of damping elements positioned at least partially within the disk around the perimeter of the platform.

The variable pitch airfoil assembly of any preceding clause, wherein the plurality of damping elements are evenly spaced apart around the perimeter of the platform.

The variable pitch airfoil assembly of any preceding clause, wherein the plurality of damping elements are positioned on a first side of the perimeter of the platform.

The variable pitch airfoil assembly of any preceding clause, wherein the plurality of damping elements contact each other on the first side of the perimeter of the platform.

The variable pitch airfoil assembly of any preceding clause, further comprising a plurality of airfoils coupled to the disk in a spaced apart manner via a plurality of trunnions.

The variable pitch airfoil assembly of any preceding clause, wherein the disk comprises a plurality of disk segments.

The variable pitch airfoil assembly of any preceding clause, wherein the variable pitch airfoil assembly is a variable pitch fan assembly, and the airfoil is a fan blade.

The variable pitch airfoil assembly of any preceding clause, wherein the variable pitch fan assembly is an unducted fan assembly of the engine.

An engine, comprising: an unducted fan section; a turbomachine located downstream of the unducted fan section, the turbomachine comprising a compressor section, a combustion section, a turbine section, and an exhaust section, the unducted fan section comprising a variable pitch fan assembly, the variable pitch fan assembly comprising: a disk having an annular shape extending about an axial direction; a plurality of fan blades coupled to the disk via a plurality of blade platforms, each of the plurality of fan blades extending outwardly from the disk in a radial direction and being rotatable relative to the disk about a respective pitch axis; and a plurality of damping elements positioned at least partially within the disk exterior of and adjacent to a perimeter of each of the plurality of blade platforms so as to provide vibration damping by friction between the plurality of damping elements, the plurality of blade platforms, and the disk while also allowing for a pitch change of each of the plurality of fan blades.

The engine of any preceding clause, wherein the plurality of damping elements is positioned within a plurality of recesses of the disk adjacent to the perimeter of the plurality of blade platforms.

The engine of any preceding clause, wherein each of the plurality of damping elements comprises a first surface contacting an interior surface of one of the plurality of recesses of the disk and a second surface contacting one of the plurality of blade platforms, wherein the first surfaces of the plurality of damping elements are flat, and the second surfaces are arcuate.

The engine of any preceding clause, wherein the friction between the plurality of damping elements, the plurality of blade platforms, and the disk occurs as a result of centrifugal forces that load the first and second surfaces of the plurality of damping elements.

The engine of any preceding clause, wherein the plurality of damping elements adjacent to the perimeter of each of the plurality of blade platforms are evenly spaced apart around the perimeter.

The engine of any preceding clause, wherein the plurality of damping elements adjacent to the perimeter of each of the plurality of blade platforms are positioned on a first side of the perimeter.

The engine of any preceding clause, wherein the plurality of damping elements adjacent to the perimeter of each of the plurality of blade platforms contact each other on the first side of the perimeter.

The engine of any preceding clause, wherein the plurality of fan blades are coupled to the disk in a spaced apart manner via a plurality of trunnions.

This written description uses examples to disclose the present disclosure, including the best mode, and also to enable any person skilled in the art to practice the disclosure, including making and using any devices or systems and performing any incorporated methods. The patentable scope of the disclosure is defined by the claims and may include other examples that occur to those skilled in the art. Such other examples are intended to be within the scope of the claims if they include structural elements that do not differ from the literal language of the claims or if they include equivalent structural elements with insubstantial differences from the literal language of the claims.

We claim:

1. A variable pitch airfoil assembly for an engine, the variable pitch airfoil assembly comprising:

a disk having an annular shape extending about an axial direction;

an airfoil coupled to the disk via a platform, the airfoil extending outwardly from the disk in a radial direction and being rotatable relative to the disk about a pitch axis; and a damping element positioned at least partially within the disk, exterior of and adjacent to a perimeter of the platform so as to provide vibration damping by friction between the damping element, the platform, and the disk while also allowing for a pitch change of the airfoil.

2. The variable pitch airfoil assembly of claim 1, wherein the damping element is positioned within a recess of the disk adjacent to the perimeter of the platform.

3. The variable pitch airfoil assembly of claim 2, wherein the damping element comprises a first surface contacting an interior surface of the recess and a second surface contacting the platform.

4. The variable pitch airfoil assembly of claim 3, wherein the first surface of the damping element is flat, and the second surface is arcuate.

5. The variable pitch airfoil assembly of claim 1, further comprising a plurality of damping elements positioned at least partially within the disk around the perimeter of the platform.

6. The variable pitch airfoil assembly of claim 5, wherein the plurality of damping elements are evenly spaced apart around the perimeter of the platform.

7. The variable pitch airfoil assembly of claim 5, wherein the plurality of damping elements are positioned on a first side of the perimeter of the platform.

8. The variable pitch airfoil assembly of claim 7, wherein the plurality of damping elements contact each other on the first side of the perimeter of the platform.

9. The variable pitch airfoil assembly of claim 1, further comprising a plurality of airfoils coupled to the disk in a spaced apart manner via a plurality of trunnions.

10. The variable pitch airfoil assembly of claim 1, wherein the disk comprises a plurality of disk segments.

11. The variable pitch airfoil assembly of claim 1, wherein the variable pitch airfoil assembly is a variable pitch fan assembly, and the airfoil is a fan blade.

12. The variable pitch airfoil assembly of claim 11, wherein the variable pitch fan assembly is an unducted fan assembly of the engine.

13. An engine, comprising:

an unducted fan section;

a turbomachine located downstream of the unducted fan section, the turbomachine comprising a compressor section, a combustion section, a turbine section, and an exhaust section, the unducted fan section comprising a variable pitch fan assembly, the variable pitch fan assembly comprising:

a disk having an annular shape extending about an axial direction;

a plurality of fan blades coupled to the disk via a plurality of blade platforms, each of the plurality of fan blades extending outwardly from the disk in a radial direction and being rotatable relative to the disk about a respective pitch axis; and a plurality of damping elements positioned at least partially within the disk, exterior of and adjacent to a perimeter of each of the plurality of blade platforms so as to provide vibration damping by friction between the plurality of damping elements, the plurality of blade platforms, and the disk while also allowing for a pitch change of each of the plurality of fan blades.

14. The engine of claim 13, wherein the plurality of damping elements is positioned within a plurality of recesses of the disk adjacent to the perimeter of the plurality of blade platforms.

15. The engine of claim 13, wherein each of the plurality of damping elements comprises a first surface contacting an interior surface of one of the plurality of recesses of the disk and a second surface contacting one of the plurality of blade platforms, wherein the first surfaces of the plurality of damping elements are flat, and the second surfaces are arcuate.

16. The engine of claim 13, wherein the friction between the plurality of damping elements, the plurality of blade platforms, and the disk occurs as a result of centrifugal forces that load the first and second surfaces of the plurality of damping elements.

17. The engine of claim 13, wherein the plurality of damping elements adjacent to the perimeter of each of the plurality of blade platforms are evenly spaced apart around the perimeter.

18. The engine of claim 13, wherein the plurality of damping elements adjacent to the perimeter of each of the plurality of blade platforms are positioned on a first side of the perimeter.

19. The engine of claim 18, wherein the plurality of damping elements adjacent to the perimeter of each of the plurality of blade platforms contact each other on the first side of the perimeter.

20. The engine of claim 13, wherein the plurality of fan blades are coupled to the disk in a spaced apart manner via a plurality of trunnions.

* * * * *